No. 847,310. PATENTED MAR. 19, 1907.
S. O. BESTUL.
THERMO ELECTRIC ANNUNCIATOR.
APPLICATION FILED OCT. 12, 1906.
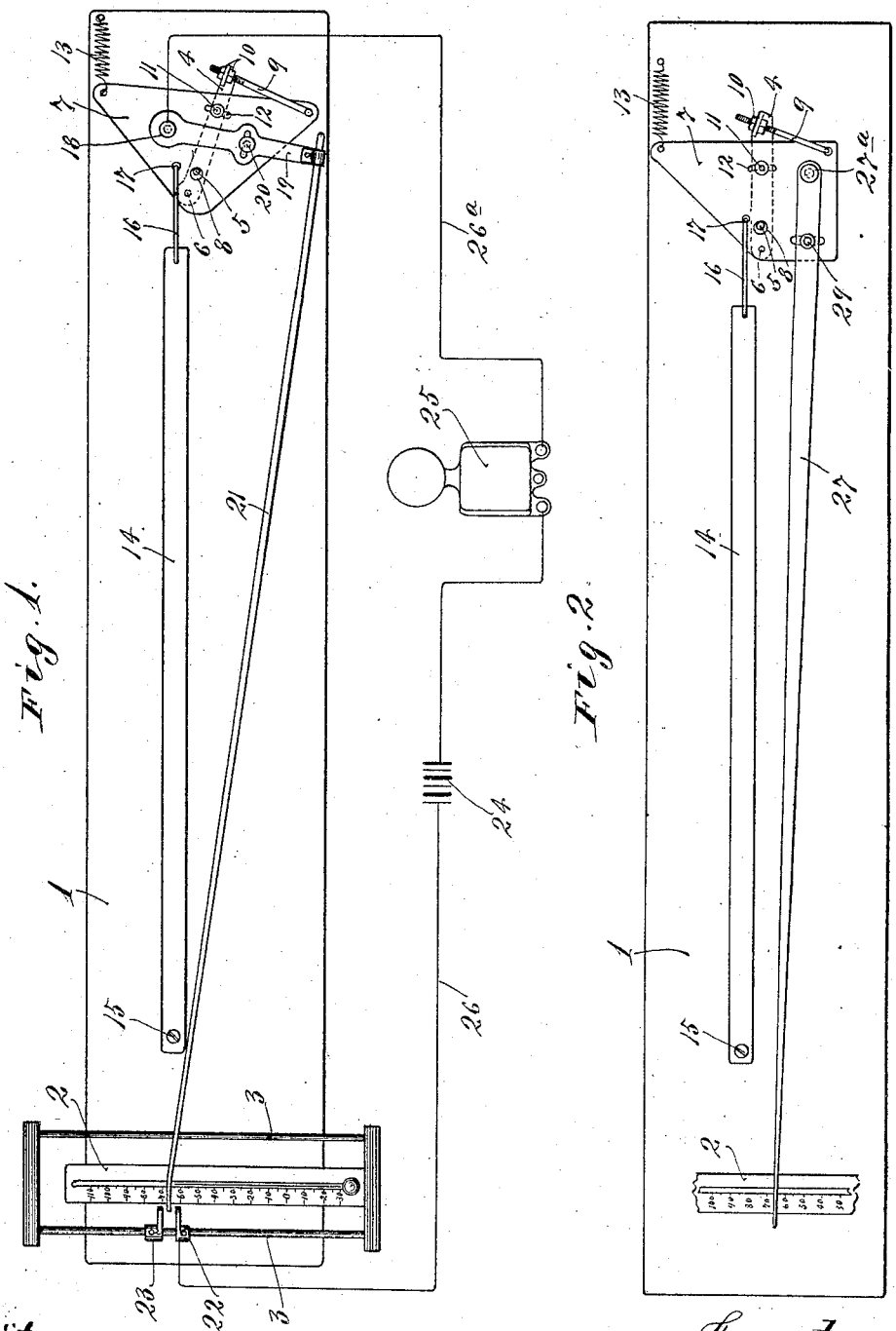
Witnesses.
A. H. Opsahl.
M. E. Roney.
Inventor.
Severin O. Bestul.
By his Attorneys.
Williamson Merchant

UNITED STATES PATENT OFFICE.

SEVERIN O. BESTUL, OF IOLA, WISCONSIN.

THERMO-ELECTRIC ANNUNCIATOR.

No. 847,310.   Specification of Letters Patent.   Patented March 19, 1907.

Application filed October 12, 1906. Serial No. 338,610.

*To all whom it may concern:*

Be it known that I, SEVERIN O. BESTUL, a citizen of the United States, residing at Iola, in the county of Waupaca and State of Wisconsin, have invented certain new and useful Improvements in Thermo-Electric Enunciators; and I do hereby declare the following to be a full, clear, and exact description of the invention, such as will enable others skilled in the art to which it appertains to make and use the same.

My invention has for its object to provide a simple and efficient thermo-electric enunciator for use in various places for indicating or announcing when the temperature has risen above or fallen below some predetermined limit or limits. Such enunciators are adapted for use in a very great many different associations. They will be found serviceable for use in connection with cold-storage plants, dwellings, and storage-houses, where a freezing temperature would do damage.

The invention consists of the novel devices and combinations of devices hereinafter described, and defined in the claims.

In the accompanying drawings, which illustrate the invention, like characters indicate like parts throughout the several views.

Referring to the drawings, Figure 1 is a view, partly in elevation and partly in diagram, illustrating a thermo-electric enunciator designed in accordance with my invention; and Fig. 2 is a view corresponding to Fig. 1, but illustrating a somewhat-modified form of the invention.

The numeral 1 indicates a suitable supporting-board, preferably of wood, to one end of which, as shown, is secured a thermometer 2, having upright rods 3. To the other end of said board 1 a vibratory lever 4 is pivoted on a pin 5, supported by the board 1. The short end of the lever 4 is pivoted at 6 to a vibratory plate 7, which plate has a clearance perforation 8, through which the pivot-pin 5 freely projects. The long end of the lever 4 is adjustably connected to one extremity of the plate 7 by a short thrust-rod 9, the threaded ends of which are provided with nuts 10. The lever 4 is also adapted to be firmly clamped against the plate 7 by a short nutted bolt 11, that works through a slot 12 in said plate. A spring 13, attached to the upper extremity of the plate 7 and to the board 1, yieldingly draws the upper thereof toward the right with respect to Fig. 1.

The numeral 14 indicates a long expansion-bar of metal, vulcanized rubber, or other suitable material which will expand and contract under varying temperatures. This expansion-bar at one end is attached to the board 1 by a suitable device, such as a screw 15. The other end of the expansion-bar 14 is connected by a link or coupling 16 to the plate 7 at a point 17, which point is offset from or above the pivot or fulcrum pin 5.

Pivoted at 18 to the plate 7 is a depending arm 19, that is adapted to be clamped thereto in any one of several different adjustments by means of a thumb-screw 20. A circuit-closer in the form of a long light metal rod or finger 21 is secured to the depending end of the arm 19. The projecting end of this arm 21 works between a pair of contacts 22 23, that are rigidly but adjustably secured on one of the rods 3 of the thermometer 2.

The numeral 24 indicates a battery or source of electrical energy, and the numeral 25 indicates an electrically-actuated bell. Numeral 26 indicates a battery-wire which runs from one pole of the battery 24 and is connected to one of the contacts—to wit, as shown, to the contact 22. The numeral 26ª indicates another battery-wire, which runs from the other pole of the battery through the coil of the bell 25 and is connected to the arm 19.

In the construction illustrated in Fig. 2 the arm 19 is eliminated, or, in other words, the said arm 19 and the rod or circuit-closer 21 are made in one part—to wit, in the form of a long pointed arm 27, which is pivoted to the plate 7 at 27ª and is adapted to be clamped to said plate 7 in different adjustments by means of a thumb-screw 29. In this construction the end of the arm 27 would be arranged to work directly between and is engageable with the contacts 22 and 23.

With the wire 26 applied to the lower contact 22 the circuit will be closed, and the bell 25 will be thrown into action whenever the temperature lowers so as to cause the arm or rod 21 to engage the said contact 22, and the contact 23 simply operates as a stop to limit the upward movement of the said arm 21. When it is desired to have the device indicate rising temperatures, the wire 26 should be applied to the contact 23, and it will of course be understood that the said wire may be connected at the same time to both of said contacts 22 and 23, so that the bell 25 would be sounded whenever the temperature varies either above or below certain predetermined points.

The spring 13 acting on the plate 7 tends to raise the free end of the contact-arm 21; but the movement of said plate is held back or limited by the expansion-bar 14 and link 16. Under rising temperatures the said expansion-bar 14 will lengthen out and permit the free end of the contact-arm 21 to be raised by the tension of the spring 13. Under lowering temperatures the said expansion-bar will contract or shorten up and will cause the free end of said contact-arm 21 to move downward in opposition to the tension of said spring 13. By adjusting the plate 7 with respect to the lever 4 the said two parts may be properly adjusted with respect to the expansion-bar 14, and by adjusting the arm 19 with respect to said plate 7 the contact-arm 21 may be properly set for coöperation with the contacts 22 and 23, regardless of the vertical adjustments of the said contacts.

The device described, while simple and of small cost, has in practice been found sufficient for the purposes had in view. The device is not limited to any particular use, but is capable of general application for indicating various temperatures and for announcing or sounding an alarm to indicate that certain changes in temperature have taken place.

What I claim is—

1. In an apparatus of the kind described, the combination with a pivoted lever 4, of a carrier-plate 7 adjustably connected to said lever, a spring 13 acting on said plate and lever, an expansion-bar 14, anchored at one end and connected at its other end to said plate 7 and controlling the movements thereof, and an electric circuit arranged to be opened and closed by movements of said plate 7, said circuit including a battery and an electrically-actuated bell, substantially as described.

2. In an apparatus of the kind described, the combination with a thermometer and an electric contact 22 adjustably mounted adjacent thereto, of a pivoted lever 4, a carrier-plate 7 adjustably connected to said lever, a spring 13 acting on said plate, an expansion-bar 14, anchored at one end and connected at its other end to said plate 7, an arm 19 adjustably connected to said plate 7, a contact-arm 21 carried by said arm 19 and coöperating with said adjustable contact 22, and an electric circuit arranged to be opened and closed by said contact members 22 and 23, said circuit including a battery and a bell, substantially as described.

In testimony whereof I have affixed my signature in presence of two witnesses.

SEVERIN O. BESTUL.

Witnesses:
C. S. B. HOEL,
O. G. LEEAN.